United States Patent [19]

Wagener

[11] 4,385,242
[45] May 24, 1983

[54] PHASE LINE DERIVED COSINE-WAVE GENERATOR AND GATE PULSE GENERATOR FOR THYRISTOR CONTROL USING SUCH GENERATOR

[75] Inventor: Paul W. Wagener, Depew, N.Y.

[73] Assignee: Westinghouse Electric Corp., Pittsburgh, Pa.

[21] Appl. No.: 217,341

[22] Filed: Dec. 17, 1980

Related U.S. Application Data

[63] Continuation-in-part of Ser. No. 960,690, Nov. 14, 1978, abandoned.

[51] Int. Cl.$^3$ .................... H03K 17/72; H03K 3/64
[52] U.S. Cl. ................... 307/252 Q; 307/261; 307/262; 363/129; 363/160
[58] Field of Search .............. 307/261, 262, 252 N, 307/252 Q; 328/74, 75, 22, 128, 178; 363/85, 87, 129, 160; 323/237, 244, 241, 320, 322

[56] References Cited

U.S. PATENT DOCUMENTS

| | | | |
|---|---|---|---|
| 3,932,771 | 1/1976 | Bucek et al. | 307/252 Q |
| 3,983,495 | 9/1976 | Epstein | 328/34 |
| 4,017,744 | 4/1977 | Johnson | 307/252 Q |
| 4,173,722 | 11/1979 | Detering | 307/252 Q |

Primary Examiner—John Zazworsky
Attorney, Agent, or Firm—C. M. Lorin

[57] ABSTRACT

In accordance with the present invention, a single line-frequency sync signal is used to derive cosine-crossover type gating angle reference waves, each with additional phase shifting accounting for phase shifts introduced by the system, such as the power transformers associated with the several thyristors in the sequence. A common variable voltage control signal and comparator are used to apply the various gating signals to the thyristor multiplexer and driver circuits. A plurality of switches controlled by the firing logic circuit establishes the order of selection between the cosine reference waves to be generated.

1 Claim, 6 Drawing Figures

PHASE LINE DERIVED COSINE-WAVE GENERATOR AND GATE PULSE GENERATOR FOR THYRISTOR CONTROL USING SUCH GENERATOR

CROSS-REFERENCE TO RELATED APPLICATIONS

This is a continuation-in-part patent application of a patent application Ser. No. 960,690 filed Nov. 14, 1978 by Paul W. Wagener for "Phase-Line Derived Cosine Wave Generator And Gate Pulse Generator For Thyristor Control Using Such Generator", now abandoned.

BACKGROUND OF THE INVENTION

The invention relates to the generation of a cosine wave reference for the generation of thyristor triggering pulses in static power converters. The cosine wave crossing timing principle is generally known in the art of static power converters (see "Static Power Frequency Changes" by Gyugyi and Pelly, John Wiley Edition 1976, pp. 279-298). The known advantage of using a cosine wave as a time reference is that it introduces a linear function between the cosine voltage and the output voltage of the thyristor bridge. It is known to modify a sine wave reference received from the line so as to generate a cosine wave which is compared with a variable DC control voltage for the determination of the thyristor conduction angle. Several problems have been met in the prior art by manipulating the inputted sine wave in a particular manner. Thus, in U.S. Pat. No. 3,983,495 the object is to obtain a sine wave to cosine wave conversion which is insensitive to frequency.

An object of the present invention is to successively generate, from a common phase line sine wave, a series of cosine waves sequentially associated with the successive phase lines, each cosine wave having the required phase shift in the sequence of firing the thyristors, such firing being effected under a single and common comparator circuit.

SUMMARY OF THE INVENTION

In accordance with the present invention, a single line-frequency sync signal is used to derive cosine-crossover type gating angle reference waves, each with additional phase shifting accounting for phase shifts introduced by the system, such as the power transformers associated with the several thyristors in the sequence. A common variable voltage control signal and comparator are used to apply the various gating signals to the thyristor multiplexer and driver circuits. A plurality of switches controlled by the firing logic circuit establishes the order of selection between the cosine reference waves to be generated.

DETAILED DESCRIPTION OF THE INVENTION

Figure 1:
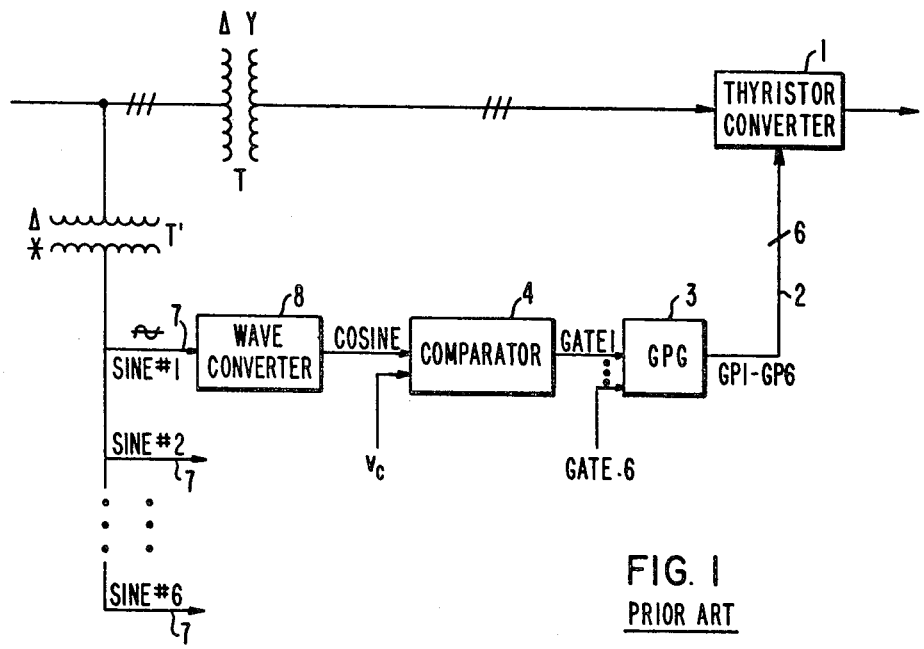
FIG. 1 shows a thyristor pulse generating system of the prior art.

One conventional method of controlling the gating angle $\alpha$ in a six thyristor power converter is to generate six individual cosine voltage waveforms evenly spaced 60° apart and to compare each cosine voltage to a reference voltage. As each cosine voltage in turn equals the reference voltage, the thyristor associated with that particular cosine wave is fired. The six thyristors are usually in a conventional three-phase rectifying bridge and the average voltage out of the bridge is varied by changing the gating angle $\alpha$. This is accomplished by varying the reference voltage. Such prior art arrangement is shown in FIG. 1. A static power converter 1, typically a six-thyristor bridge, is supplied with AC power through a power transformer T. The thyristors are gated via lines 2 by a gating pulse generator 3 firing the thyristors in sequence with a conduction angle established by a comparator 4. As shown in the prior art, the cosine wave crossing pulse timing method is used to establish the firing angle by reference to a direct current voltage signal reference ($V_c$ as shown inputted into comparator 4 of FIG. 1, and comparator 118 of FIG. 6). (In this respect, see "Thyristor Phase-Controlled Converters and Cycloconverters" by B. R. Pelly—John Wiley & Sons 1971, pages 229-240.) The cosine wave is derived from an auxiliary transformer T' having a primary winding in delta configuration and a six-winding equally distributed secondary. The secondary windings provide six reference sine waves at $\pi/3$ from each other, on respective lines 7 each applied to a corresponding wave converter 8 generating the intended cosine time wave for the comparator 4. Thus, six wave converters and six comparators are required for firing six thyristors in this arrangement. Gating signals GATE 1 to GATE 6 are thus derived and applied to the gate pulse generator 3 successively.

Instead of generating separately six time waves, it is shown in U.S. Pat. No. 4,017,744 of F. O. Johnson, how with ramps, e.g., linear time functions, digital technique can be used to directly select from a single wave generator a plurality of time references, each having the proper phase as prescribed by the logic of the gating pulse generator.

Figure 2:
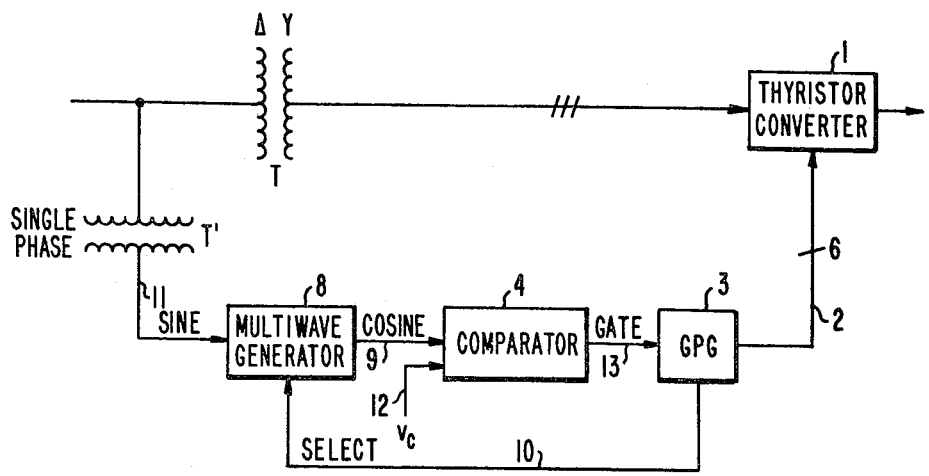
FIG. 2 schematically shows the thyristor gate pulse generator according to the invention.

As shown in FIG. 2, according to the present invention, a single wave generator 8 is used to convert the sine wave from transformer T' into a cosine wave. A single output line 9 applied concurrently with the signal $v_c$ to a single comparator 4 causes, at the instant the threshold of the comparator is exceeded, the generation of a gating signal for the gating pulse generator 3. The wave generator 8 is controlled from lines 10 by the logic of gating pulse generator 3. As a result, generator 8 builds up instantaneously one of several inherent cosine waves related to the sine wave inputted on line 11 from transformer T'.

Figure 3:
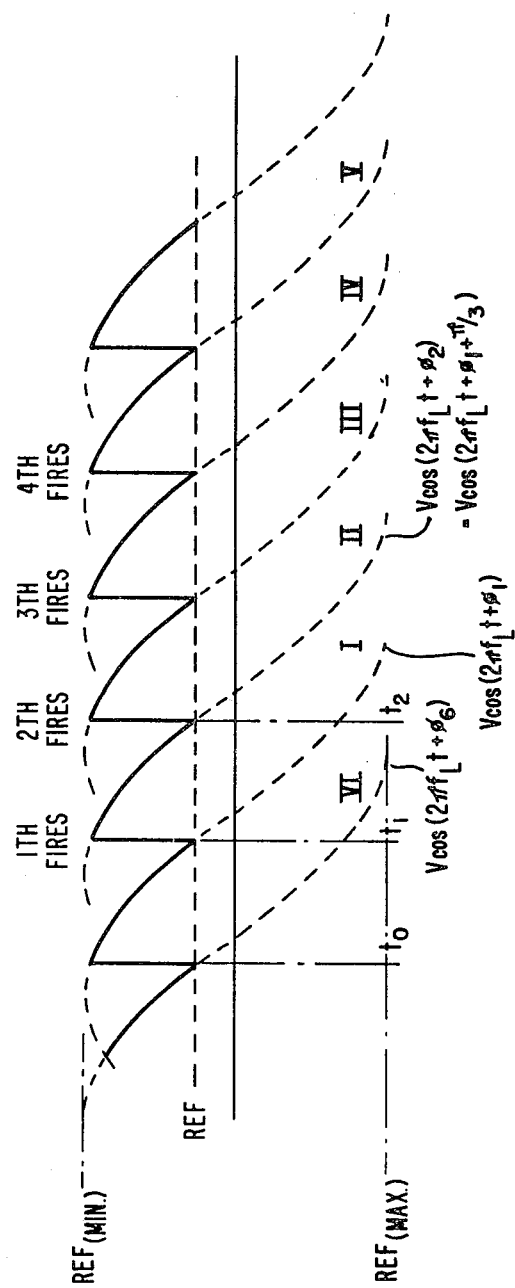
FIG. 3 shows with curves, the firing scheme according to the present invention.

Referring to FIG. 3, six cosine waves associated with six respective thyristors are shown in relation to the reference voltage $v_c$. The conductive periods are shown by bold lines on the curves and by reference to the thyristor which is "next" to be fired in sequential order at the instant of commutation. It appears that the successive cosine waves are as follows:

$V_{cos} (2\pi f_L t + \phi_1)$; $V_{cos} (2\pi f_L t + \phi_2)$;
$V_{cos} (2\pi f_L t + \phi_6)$
where $\phi_2 = \phi_1 + \pi/3$, etc.

These six cosine waves are usually developed on an individual basis, often from a transformer having a three-phase primary and a secondary possessing six windings from which are derived the six cosine signals. This approach requires six matched filters, six comparators and a complex transformer. With the system according to the present invention, only a single-phase sinusoidal synch signal is needed to generate all six cosine waves. Excellent filtering exist inherently in the latter system.

Figure 4:
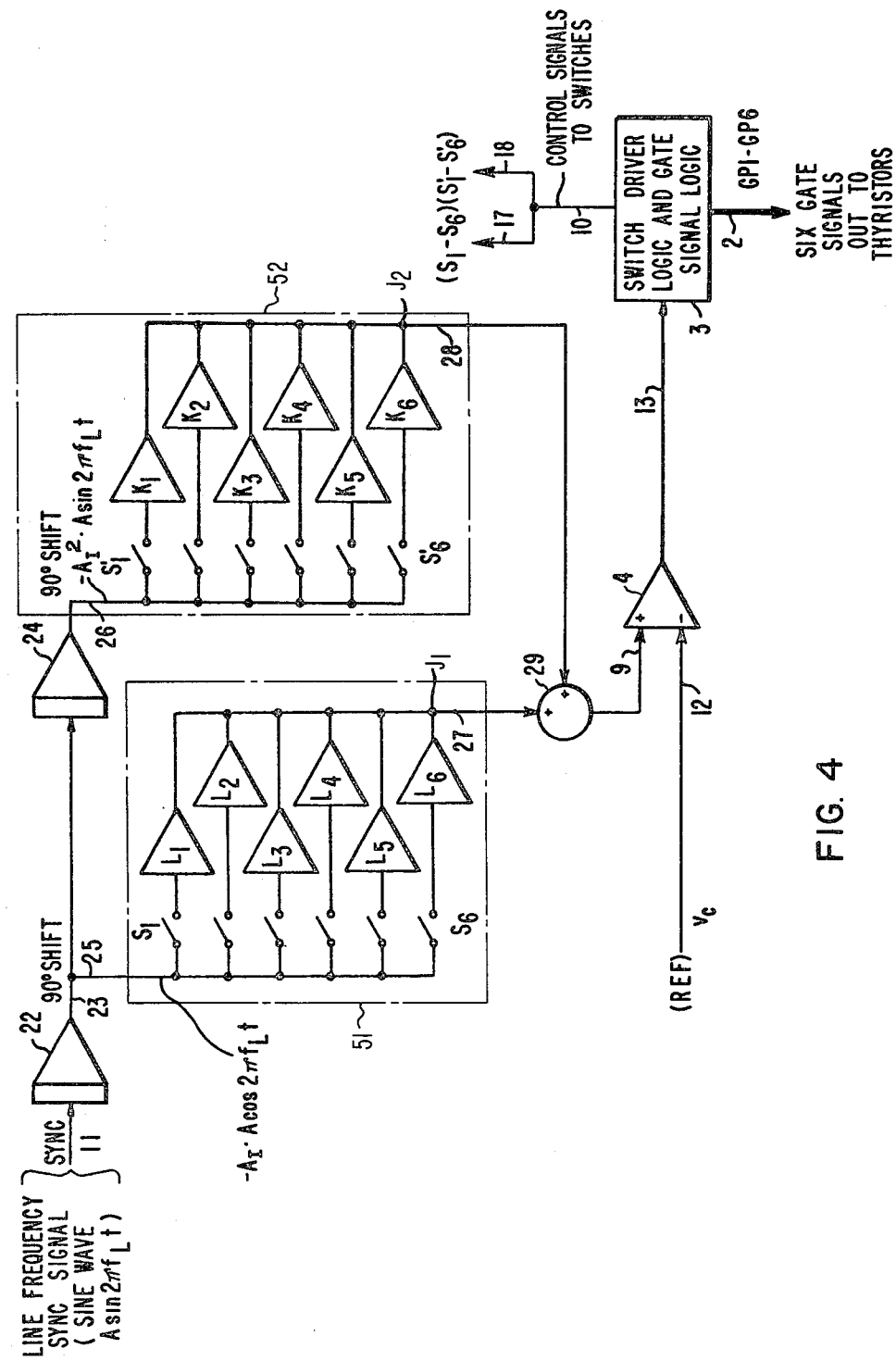
FIG. 4 is a diagrammatic representation of a gating pulse generator embodying a cosine wave generator for control of thyristor firing angles in accordance with the present invention.

Referring to FIG. 4, from the output of integrator 22, on line 25, and from the output of integrator 24, on line 26, two sets of switches ($S_1$–$S_6$) and ($S'_1$–$S'_6$) multiplex the respective lines 25 and 26 toward several amplifiers of different gains ($L_1$–$L_6$) for the first set of switches, ($K_1$–$K_6$) for the second set of switches, with a one-to-one relationship between the gains and the associated set of switches. All parallel lines in each set have a junction point $J_1$ for ($L_1$–$L_6$) and $J_2$ for ($K_1$–$K_6$). The two sets of switches are operated in parallel and the outputs from $J_1$ on line 27, from $J_2$ on line 28, are summed up by a summer 29 outputting the desired cosine signal on line 9 to the non-inverting input of an operational amplifier 4 used as a comparator, having a threshold defined by a reference signal $v_c$ applied on line 12 to the inverting input thereof. The generated signal is inputted on line 13 as a triggering signal into the gating pulse generator 3. The latter may include, as generally known, a ring-counter determining the sequential order of the thyristors and a pulse forming circuit driving the thyristors. Six gate signals $GP_1$–$GP_6$ are applied by lines 2 to the respective thyristors. The two sets of six switches ($S_1$–$S_6$) and ($S'_1$–$S'_6$) are controlled by pairs via lines 10 and 17 to one set, via lines 10 and 18 to the other set, in accordance with the logic of circuit 3 which determines the firing of the thyristors.

Simple trigonometry establishes that $\cos(\omega t + \phi) = \cos \omega t \cos \phi - \sin \omega t \sin \phi$. In the light of this equation, it is seen that summer 29 adds two trigonometric functions derived from the respective integrators 22 and 24 as follows: $A \sin 2\pi f_L t$ on line 11 becomes $-A_I A \cos 2\pi f_L t$ after a 90° shift by integration through circuit 22. Circuit 24 converts the latter function into $-A_I^2 A \sin 2\pi f_L t$ following another 90° shift. Thus, on lines 25 and 26, the two functions $\cos \omega t$ and $-\sin \omega t$ are derived. It remains to define coefficients $\cos \phi$ and $\sin \phi$ which are a function of the particular phase $\phi$. The gains ($L_1$–$L_6$) and the gains ($K_1$–$K_6$) are paired so as to provide six pairs of coefficients associated with the signals of lines 25 and 26.

The switches ($S_1$–$S_6$), ($S'_1$–$S'_6$) are sequentially controlled from lines 17 and 18 to establish the required common phase shift in exact correlation with the "next" thyristor in each pair by $L_1$, $K_1$; $L_2$, $K_2$; ... or $L_6$, $K_6$.

It appears that while on line 11 the exact instantaneous magnitude of the power line is known, for any pair of thyristors involved at a given time, a signal corresponding to one of the curves of FIG. 3 is applied to comparator 4. Thus, curve I is followed from $t_0$ to $t_1$ when the curve intersects $v_c$, at which time by line 13 thyristor 1TH is fired. From $t_1$ to $t_2$, curve II is followed on line 9 and at time $t_2$, thyristor 2TH is fired in response to the pulse on line 13, and so on. $v_c$ may vary from $ReF_{min}$ to $ReF_{max}$ causing the gating angle $\alpha$ to range from zero to $\pi$.

As shown in FIG. 4, the SYNC signal received on line 11, is a sine wave at the same frequency as the three-phase AC line feeding the thyristor bridge, namely ($A \sin 2\pi f_L t$), where $f_L$ is the line frequency. This signal is inputted into a first integrator 22 which shifts the SYNC signal almost exactly 90° and filters out the higher frequency voltage spikes and notches which could cause misgating. The output of integrator 22 is fed via line 23 into a second integrator 24 which shifts the SYNC signal by another 90°. The outputs of integrators 22 and 24 are respectively inputted into adjustable gain circuits 51 and 52 via respective lines 25 and 26. As explained hereinafter, circuits 51 and 52 each contain parallel channels of different gains which are selected by pairs, one within circuit 51, the other within circuit 52. Switches $S_1$–$S_6$ in block 51 and switches $S'_1$–$S'_6$ in block 52 when appropriately controlled typically select corresponding gains $L_1$–$L_6$ in block 51 and gains $K_1$–$K_6$ in block 52, assuming six parallel channels symbolized by operational amplifiers $L_1$–$L_6$ in block 51 and operational amplifiers $K_1$–$K_6$ in block 52. In relation to a particular thyristor ($T_1$ ... or $T_6$) which is "next" to be fired, a corresponding pair of switches from the respective blocks such as ($S_1$, $S'_1$), ... ($S_6$, $S'_6$) are closed thereby to define at the output of summer 29 connected between blocks 51 ad 52 a particular one of six possible time waves. Whenever such a pair of switches are closed, gains $K_n$ and $L_n$ are introduced by blocks 51 and 52, respectively. As a result, on output lines 27, 28 of blocks 51, 52, signals $(A \cdot A_I^2 \cdot K_N) \sin 2\pi f_L t$ and $(A \cdot A_I \cdot L_n) \cos 2\pi f_L t$ are obtained which are summed up by summer 9 to derive on line 9 at the output of the summer a net cosine wave $V_{cos} (2\pi f_L t + \phi_n)$ which is compared with voltage $v_c$ to determine when the "next" thyristor is to be fired. As comparator 4 senses equality, gating is initiated. The next pair of switches closes and the original pair opens, thereby to send a new cosine wave $V_{cos} (2\pi f_L t + \phi_{n+1}) = V_{cos} (2\pi f_L t + \phi_n + \pi/3)$ into comparator 4 to determine when the "next" thyristor is to be fired. Although the sine and cosine values have been explained in terms of voltages, it is understood that it is also contemplated that the SYNC signal be converted immediately and continuously into binary numbers so that all of the sine, cosine and coefficient values will be binary numbers treated within a processor. All addition, multiplication and logic would then also be handled by the processor.

Referring again to the mathematical relationship: $a \sin \theta + b \cos \theta = c \cos (\theta + \phi)$, the constants $K_i$ and $L_i$ must be selected by pairs so that the desired phase shift $\phi_n$ and amplitude $V$ of the resulting cosine wave is as required for each of the generated six cosine waves.

Like any analog integrator, numerical integrators with constant sampling frequency tend to have a gain inversely proportional to input frequency. In such case, the value of $A_I$ would be inversely proportional to line frequency. This would have to be compensated for in variable line frequency applications.

Heavy lines in FIG. 3 show the actual value going to the comparator (+) input at any instance. Thyristors are fired as shown. Gating angle can be varied from 0° to 180° by varying $v_c$. The voltage out of a converter bridge operating with continuous current is approximately proportional to $\cos \alpha$. The angle $\alpha$ is proportional to the arc $\cos(v_c)$. Therefore, the DC voltge out of the bridge is linearly proportional to $v_c$, which, as mentioned earlier, is an advantage typical of cosine-crossover type gate generators.

The constant coefficients $K_i$ and $L_i$ are calculated in order to take into account additional phase shifts between the SYNC signal and the bridge AC voltage due to transformers T and T', or other components. The phase shift, however, must be constant over any range of line frequencies at which the gate circuit has to operate.

If implemented by analog techniques, inexpensive amplifier and analog switch components do exist. Analog switches could be used to successively change an amplifier's gain to provide the six gain constants $L_n$. Likewise for the various values of $K_n$. Two integrating amplifiers, two gain amplifiers (for the $K_n$ and $L_n$ constant) a summing amplifier and a comparator would require a minimum of six amplifiers to implement the circuit. This compares favorably with the six comparators used in the conventional approach. Thus, the gain switching logic can be handled by a single PROM (programmable read-only memory). This implementation is shown by FIG. 5.

Figure 5:
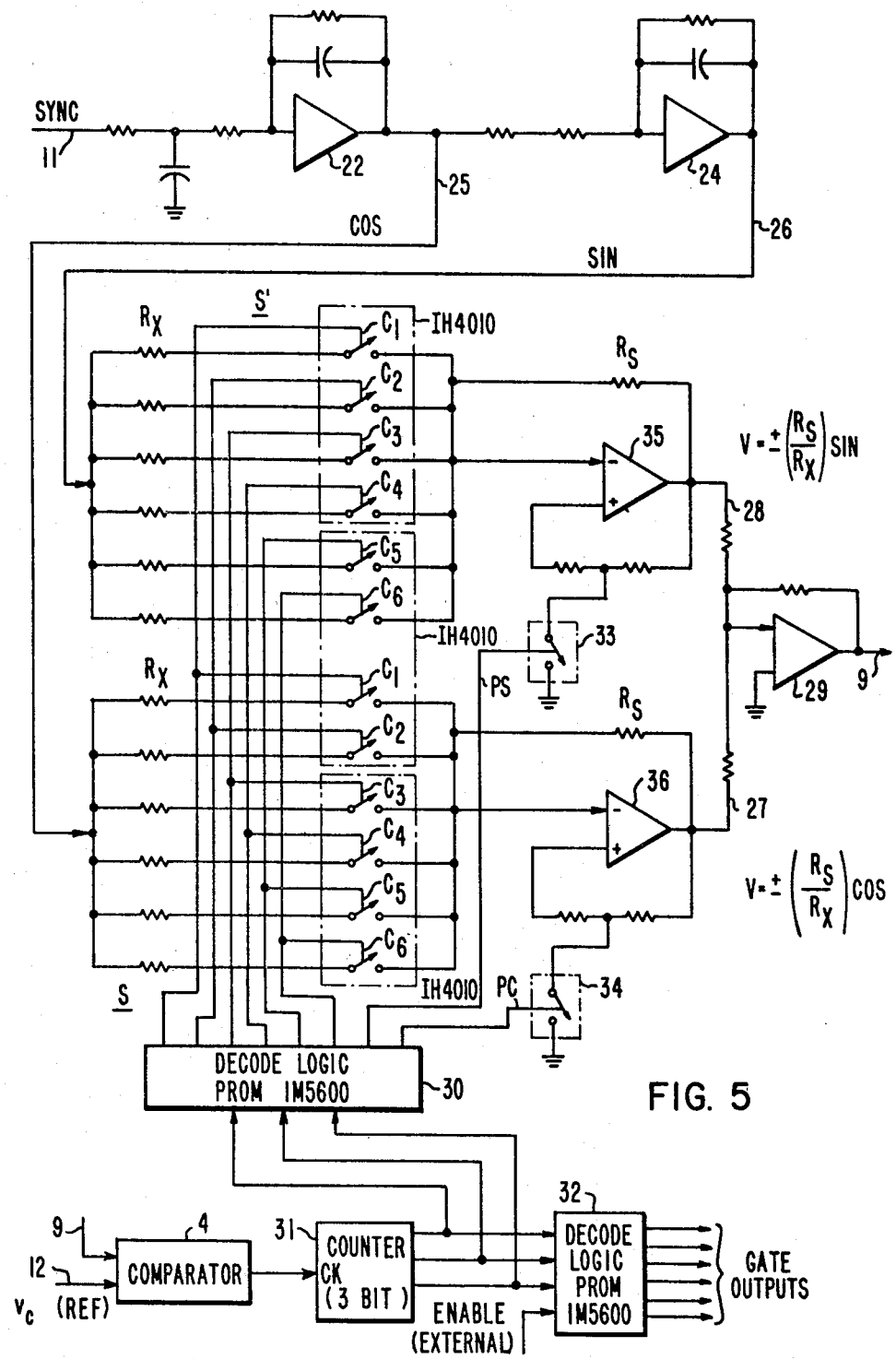
FIG. 5 typically shows the circuitry used in the preferred embodiment of the invention.

FIG. 5 can be understood by reference to FIG. 4. Three solid state devices IH4010 are used to form switches ($S_1$–$S_6$) and ($S'_1$–$S'_6$). Each of these solid state devices embodies four FET switches, controlled by respective lines ($C_1$–$C_4$), ($C_5$, $C_6$, $C_1$, $C_2$) and ($C_3$–$C_6$) in accordance with the logic of a decode logic circuit 30, which is a PROM, type IM5600, located within gating pulse circuit 3. Comparator 4 clocks a 3-bit counter 31 which in turn controls the decode logic circuit 30 and another decode logic circuit 32, the latter to generate the thyristor gating pulses. The control signals from circuit 30 are $C_1$–$C_6$, and also signals PS (for sine wave select, e.g., lines 26 and 28) and PC (for cosine wave select, e.g., lines 25 and 27). Signals PS and PC control FET devices 33 and 34. As shown in FIG. 5, operational amplifier 35 is associated with ($S'_1$–$S'_6$) on the sine wave side, while operational amplifier 36 is associated with ($S_1$–$S_6$) on the cosine wave side. These amplifiers are inserted in circuit with resistors $R_x$ and $R_s$ to provide a gain in accordance with the value of $R_x$, e.g., with the selection made by ($C_1$–$C_6$). Thus on line 28 at the output of operational amplifier 35 is derived a wave V representing $\pm R_s/R_x$ SIN, while with operational amplifier 36, the wave is $\pm R_s/R_x$ COS.

In the preceding, it has been assumed that on lines 23, 25, 26, 27, 28 and 10 signals having the form of a cosine wave were treated to determine when the "next" thyristor is to be fired. It is within the scope of the present invention to convert the signals of lines 11, 23 and 26 directly and continuously into binary numbers, so that all the sine, cosine and coefficient values would be binary numbers. This could be achieved by data processing within a microprocessor which would handle addition, multiplication and other logic operations as earlier stated.

Figure 6:
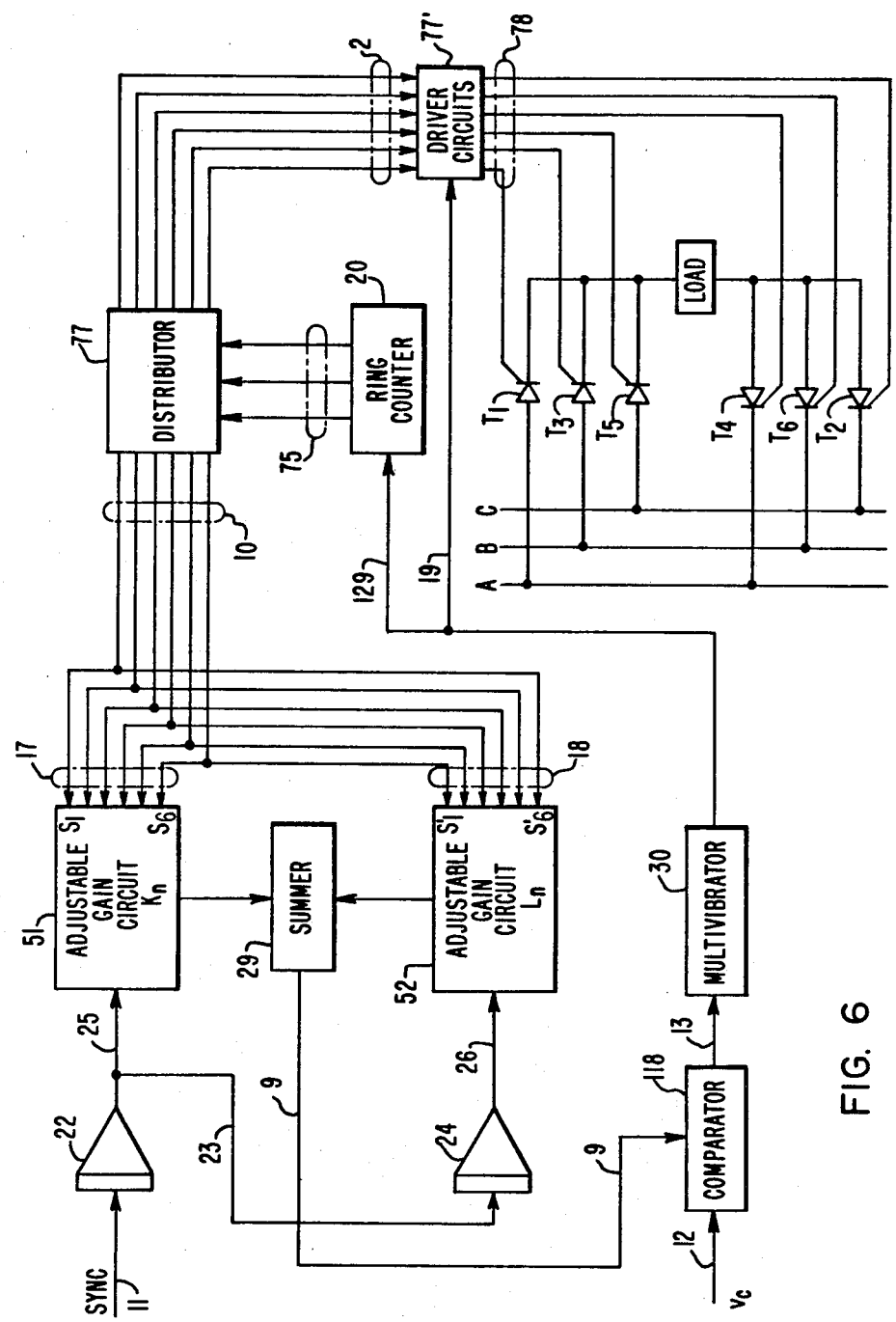
FIG. 6 shows illustratively the cosine wave generator of FIG. 4 in the context of a control system for a thyristor bridge.

Referring to FIG. 6, the cosine wave generator of FIG. 4 is shown connected in circuit within a gate pulse generator of the type disclosed in either U.S. Pat. No. 4,017,744 of F. O. Johnson, or U.S. Pat. No. 4,028,609 of R. L. Detering. For the purpose of describing the preferred embodiment of the invention, the Johnson and the Detering patents are hereby incorporated by reference. The SYNC sine wave signal of line 11 is shifted by 90° by integrator 22 and fed into block 51. It is shifted again by 90° when passed through integrator 24, then fed into block 52. Switches $S_1$–$S_6$ of block 51, and switches $S'_1$–$S'_6$ of block 52 are FET devices controlled from respective lines 17 and 18, as explained hereinafter, so that a particular pair of switches $S_1$–$S'_1$ ... $S_6$–$S'_6$ is closed at any given time and summer 29 provides at the output on line 9 one selected time wave reference $V_{cos}(2\pi f_L t + \phi_n)$ as explained earlier; such time wave reference being shifted by $\pi/3$ from the preceding as well as from the subsequent time wave derived by switch selection in the sequence of firing of the thyristors. Comparator 118 is responsive to the time wave reference of line 9 from summer 29 and to a reference voltage $v_c$ determining the firing angle of the thyristors. Comparator 118 via line 13 controls a multivibrator 30 which generates a triggering pulse on line 129. A ring counter 20 actuated by the triggering pulses transfer states and causes via line 75 a distributor 77 to logically define the multiplexing relation affecting firing of the "next" thyristor to be fired. This occurs by line 2, driver circuit 77' and firing line 78 to the control electrodes of thyristors $T_1$–$T_6$. The pulse of line 29 is carried by line 19 onto driver circuit 77', whereby a firing pulse is triggered on a corresponding one of lines 78. At the same time, ring counter 20 causes the distributor 77 to select by lines 10 and 17, 18 an appropriate pair of FET devices ($S_1$, $S'_1$) ... ($S_6$, $S'_6$) within blocks 51, 52, thereby preparing the formation of a cosine wave on line 9 at the output of summer 29 to match the phasing of the lines with respect of the "next" thyristor to be fired.

I claim:
1. A thyristor gating control system including a pulse generator for generating gating pulses; a distributor responsive to said pulse generator for selecting thyristors to be turned ON in accordance with a predetermined sequential order; a time wave generator for providing a cosine wave in relation to a fundamental sine wave and a comparator responsive to said cosine time wave and to a control voltage for establishing a firing angle for a selected thyristor; said time wave generator comprising:
    first means for integrating said fundamental sine wave to form a first signal in sine form;
    second means for integrating said first signal to form a second signal in said sine form;
    a first plurality of multiplexed amplifier channels for amplifying said first signal, with said first channels having respective gains forming a first set;
    a second and like plurality of multiplexed amplifier channels for amplifying said second signal, with said second channels having respective gains forming a second set;
    said distributor being adapted to select from said first and second pluralities a pair of multiplexed channels belonging to said first and second pluralities, respectively, each such pair being selected in accordance with a selected thyristor; and
    means for summing the outputs of the multiplexed channels of a selected pair to derive said cosine time wave.

* * * * *